US012387468B2

(12) United States Patent
Tilke et al.

(10) Patent No.: US 12,387,468 B2
(45) Date of Patent: Aug. 12, 2025

(54) RAPID AND REALISTIC THREE-DIMENSIONAL STRATIGRAPHIC MODEL GENERATOR CONDITIONED ON REFERENCE WELL LOG DATA

(71) Applicant: SCHLUMBERGER TECHNOLOGY CORPORATION, Sugar Land, TX (US)

(72) Inventors: Peter Tilke, Cambridge, MA (US); Marie Etchebes, Clamart (FR); Marie Emeline Cecile Lefranc, Lysaker (NO); Lingchen Zhu, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/693,042

(22) PCT Filed: Sep. 20, 2022

(86) PCT No.: PCT/US2022/044087
§ 371 (c)(1),
(2) Date: Mar. 18, 2024

(87) PCT Pub. No.: WO2023/044146
PCT Pub. Date: Mar. 23, 2023

(65) Prior Publication Data
US 2024/0331363 A1    Oct. 3, 2024

Related U.S. Application Data

(60) Provisional application No. 63/246,097, filed on Sep. 20, 2021.

(51) Int. Cl.
G06V 10/774   (2022.01)
G06V 10/82    (2022.01)

(52) U.S. Cl.
CPC .......... G06V 10/774 (2022.01); G06V 10/82 (2022.01)

(58) Field of Classification Search
CPC ........................ G06V 10/774; G06V 10/82
See application file for complete search history.

(56) References Cited

U.S. PATENT DOCUMENTS 10,422,924 B2    9/2019  Zhang
11,741,371 B2 *  8/2023  Sultan ............... G06F 40/30
                                                706/11
(Continued)

FOREIGN PATENT DOCUMENTS

AU    2012357785 B2    12/2014
KR    102279772 B1     7/2021
(Continued)

OTHER PUBLICATIONS

Oord et al., "Neural Discrete Representation Learning," in CoRR, abs/1711.00937, 2017, May 30, 2018 (11 pages).
(Continued)

Primary Examiner — Nancy Bitar
(74) Attorney, Agent, or Firm — Jeffrey D. Frantz

(57) ABSTRACT

Platforms and methods for generating 3D stratigraphic models are proved wherein the platform utilizes a Motion and Content decomposed GAN that is trained using actual data or generated data. The generation of the stratigraphic models can also include using Wasserstein training loss for improved model diversity.

13 Claims, 4 Drawing Sheets

(56) References Cited

U.S. PATENT DOCUMENTS

| | | | |
|---|---|---|---|
| 2009/0276157 | A1 | 11/2009 | Wilkinson |
| 2017/0329046 | A1 | 11/2017 | Palmowski |
| 2018/0321404 | A1 | 11/2018 | Klinger |
| 2019/0236455 | A1* | 8/2019 | Taylor .................. G06V 10/776 |
| 2020/0183046 | A1 | 6/2020 | Wheelock |
| 2020/0204822 | A1* | 6/2020 | Liu ......................... G06T 13/40 |
| 2020/0308934 | A1 | 10/2020 | Li |
| 2021/0110280 | A1 | 4/2021 | Akkurt |
| 2021/0165937 | A1 | 6/2021 | Bailey |
| 2022/0082729 | A1 | 3/2022 | Algheryafi et al. |
| 2023/0088055 | A1 | 3/2023 | Tilke |
| 2024/0111071 | A1 | 4/2024 | Tilke |
| 2024/0331363 | A1* | 10/2024 | Tilke .................... G06N 3/0475 |

FOREIGN PATENT DOCUMENTS

| | | | |
|---|---|---|---|
| WO | 2013188911 | A1 | 12/2013 |
| WO | 2017076966 | A1 | 5/2017 |
| WO | 2018208634 | A1 | 11/2018 |
| WO | 2020146863 | A1 | 7/2020 |
| WO | 2021150929 | A1 | 7/2021 |
| WO | 2023044144 | A1 | 3/2023 |
| WO | 2023044146 | A1 | 3/2023 |

OTHER PUBLICATIONS

Kingma et al., An Introduction to Variational Autoencoders, Now, Foundations and Trends, 2019, Dec. 11, 2019, (89 pages).
Find Ancient River Channels, downloaded on Jan. 30, 2023 from (https://xeek.ai/challenges/gamma-log-facies/overview) (3 pages).
Character of Log Response—SEPM Strata, downloaded on Jan. 30, 2023 from (http://sepmstrata.org/page.aspx?&pageid=168&3) (3 pages).
Well Log Suites—SEPM Strata downloaded on Jan. 30, 2023 from (http://sepmstrata.org/page.aspx?&pageid=167&3) (2 pages).
Kendall et al., 2005, System Tract Bounding Surfaces, Lithofacies, Geometric Hierarchies and Stacking Patterns: Keys to Shallow Water Carbonate Interpretation, AAPG Bulletin, vol. 89, Program Abstracts (1 pages).
Krassay, A.A., 1998, Outcrop and drill core gamma-ray logging integrated with sequence stratigraphy: examples from Proterozoic sedimentary successions of northern Australia, AGSO Journal of Australian Geology and Geophysics 17(4), 285-299.
Schiltz M., 2020, On the use of CPTs in stratigraphy: recent observations and some illustrative cases, Geologica belgica 23/3-4: 399-411.
Soil Hollandse Kust (zuid) · Offshorewind RVO, downloaded on Jan. 30, 2023 from (https://offshorewind.rvo.nl/ soilzh) (6 pages).
International Search Report and Written Opinion issued in PCT Application PCT/US2022/044083, dated Jan. 18, 2023 (11 pages).
Jobe et al., Automated Interpretation of Depositional Environments using measured Stratigraphic Sections and Machine-Learning Models, 2019 AAPG Annual Convention and Exhibition, Jun. 30, 2019, p. 1.
Wu et al., Machine Learning-Based Method for Automated Well Log Processing and Interpretation, 2018 SEG International Exposition and Annual Meeting, Oct. 14, 2018, pp. 2041-2045.
Zoph et al., Tranfer Learning for Low-Resource Neural Machine Translation, Proceedings of the 2016 Conference on Empirical Methods in Natural Language Processing, Nov. 2016, pp. 1-8.
Tetzlaff et al., 2014, GPM (Geologic Process Modeling), Schlumberger, available in Petrel (17 pages).
Flumy, downloaded on Jan. 30, 2023 from (https://flumy.minesparis.psl.eu/download/) (6 pages).
DionisosFlow (Beicip—Franlab), downloaded on Jan. 30, 2023 from https://beicip.com/, (3 pages).
Delft3d, downloaded on Jan. 30, 2023 from (https://oss.deltares.nl/web/delft3d) (3 pages).
Dupont et al., [2018]. Generating Realistic Geology Conditioned on Physical Measurements with Generative Adversarial Networks. Arxiv: 1802.03065. (10 pages).
Folk et al., [1957]. Brazos River bar [Texas]; a study in the significance of grain size parameters. J Sediment Res 27, 3-26.
Howard et al., [1984]. Sufficient Conditions for River Meandering: A Simulation Approach. Water Resources Research 20, 1659-1667.
Krumbein [1934]. Size frequency distributions of sediments. J Sediment Res 4, 65-77.
Pyrcz et al., [2014]. Process-mimicking Modeling Considerations. in William C. Gussow Geoscience Conference (16 pages).
Sylvester et al., [2019]. High curvatures drive river meandering. Geology 47, 263-266.
Sylvester et al., [2021]. Autogenic translation and counter point bar deposition in meandering rivers. GSA Bulletin (18 pages).
Zhang et al., Generating Geologically Realistic 3D Reservoir Facies Models Using Deep Learning of Sedimentary Architecture with Generative Adversarial Networks, Petroleum Science, 2019 (10 pages).
Tulyakov et al., "MoCoGAN: Decomposing Motion and Content for Video Generation," in IEEE Conference on Computer Vision and Pattern Recognition (CVPR), 2018. (13 pages).
Cho et al., "Learning Phrase Representations using RNN Encoder-Decoder for Statistical Machine Translation," in Conference on Empirical Methods in Natural Language Processing, 2014. (15 pages).
Hochreiter et al., "Long Short-term Memory," Neural Computation, vol. 9, No. 8: 1735-1780, 1997.
Goodfellow, "Nips 2016 Tutorial: Generative Adversarial Networks," in Neural Information Processing Systems, 2016. (57 pages).
Gulrajani et al., "Improved Training of Wasserstein GANs," in Proceedings of the 31st International Conference on Neural Information Processing Systems, 2017. (20 pages).
International Search Report and Written Opinion issued in PCT Application PCT/US2022/044087, dated Jan. 6, 2023 (10 pages).
Kahembwe et al., Lower Dimensional Kernels for Video Discriminators, Neural Networks, vol. 132, pp. 506-520, Sep. 26, 2020.
Yushchenko et al., Markov Decision Process for Video Generation, 2019 IEEE/CVF International Conference on Computer Vision Workshop (ICCVW), pp. 1523-1532, Oct. 27-28, 2019.
Robertson P.K., 2010a. Soil behaviour type from the CPT: an update. 2nd International Symposium on Cone Penetration Testing, Huntington Beach, CA, USA. vol. 2, 575-583.
Robertson P.K., 2010b. Estimating in-situ soil permeability from CPT and CPTu. 2nd International Symposium on Cone Penetration Testing, Huntington Beach, CA, USA. vol. 2, 535-542.
International Preliminary Report on Patentability issued in the PCT Application No. PCT/US2022/044087 dated Apr. 4, 2024, 6 pages.
International Preliminary Report on Patentability issued in the PCT Application No. PCT/US2022/044083 dated Apr. 4, 2024, 6 pages.
Office Action issued in U.S. Appl. No. 17/933,506 dated May 24, 2024, 40 pages.
Office Action issued in U.S. Appl. No. 18/467,046 dated May 14, 2024, 13 pages.

\* cited by examiner

RAPID AND REALISTIC THREE-DIMENSIONAL STRATIGRAPHIC MODEL GENERATOR CONDITIONED ON REFERENCE WELL LOG DATA

CROSS-REFERENCE TO RELATED APPLICATIONS

The present application claims priority to U.S. Provisional Application 63/246,097, filed Sep. 20, 2021, the entirety of which is incorporated by reference.

FIELD OF THE DISCLOSURE

The present disclosure generally relates to synthesis data platform ("SDP"), and the use of synthetic data generated from the SDP to train artificial intelligence and machine learning solutions ("AIML"), and building stratigraphic models in an automated fashion using trained AIML solutions. In one or more embodiments, the SDP can be used to create models to train and can be used to create models to train a Gan-based solution, and the Gan-based solution can be used to efficiently create models conditioned to observed logs.

BACKGROUND INFORMATION

Stratigraphic processes in three-dimensional modeling is the best way to avoid generating unrealistic representations of the subsurface leading to inaccurate forecasting of reservoir production, carbon capture, utilization and storage capacity, or fluid migration for geothermal energy production. However, the generation of accurate three-dimensional modeling is time intensive and often does not take account of observed well measurements during the model creation.

Synthetic data generated using a SDP can be used to build robust AIML solutions that fit the business needs of subsurface stratigraphic interpretation use cases. AIML solutions are very useful in the training of a generator and discriminator for a generative adversarial network ("GAN"). Furthermore, a GAN solution of a platform that is lightweight and capable of video generation is developed to create a robust three-dimensional stratigraphic models.

The disclosed platforms and use of synthetic data overcome the difficulties associated with building stratigraphic models and training AIML solutions to allow for accurate forecasting of reservoir production, carbon capture, utilization and storage capacity, and fluid migration for geothermal energy production.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of training a motion and content decomposed generative adversarial network is disclosed. The method may comprise training a video discriminator and an image discriminator with a neural network in an image generator using at least two batches of data, wherein the data batch sent to train the image discriminator comprises randomly selected data from one of actual data and generated data. The method may further comprise freezing neural networks for the video discriminator and the image discriminator. The method may also further comprise training, using at least one batch of data, the image generator with the neural networks for the video discriminator and the image discriminator.

In another example embodiment, a computer program product is disclosed. The product may comprise a computer usable medium having a computer readable program code embodied therein, said computer readable program code adapted to be executed to implement a method for generating a report, said method comprising: training a video discriminator and an image discriminator with a neural network in an image generator using at least two batches of data, wherein the data batch sent to train the image discriminator comprises randomly selected data from actual data or generated data. The method may further comprise freezing neural networks for the video discriminator and the image discriminator and training, using at least one batch of data, the image generator with the neural networks for the video discriminator and the image discriminator.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

Figure 1:
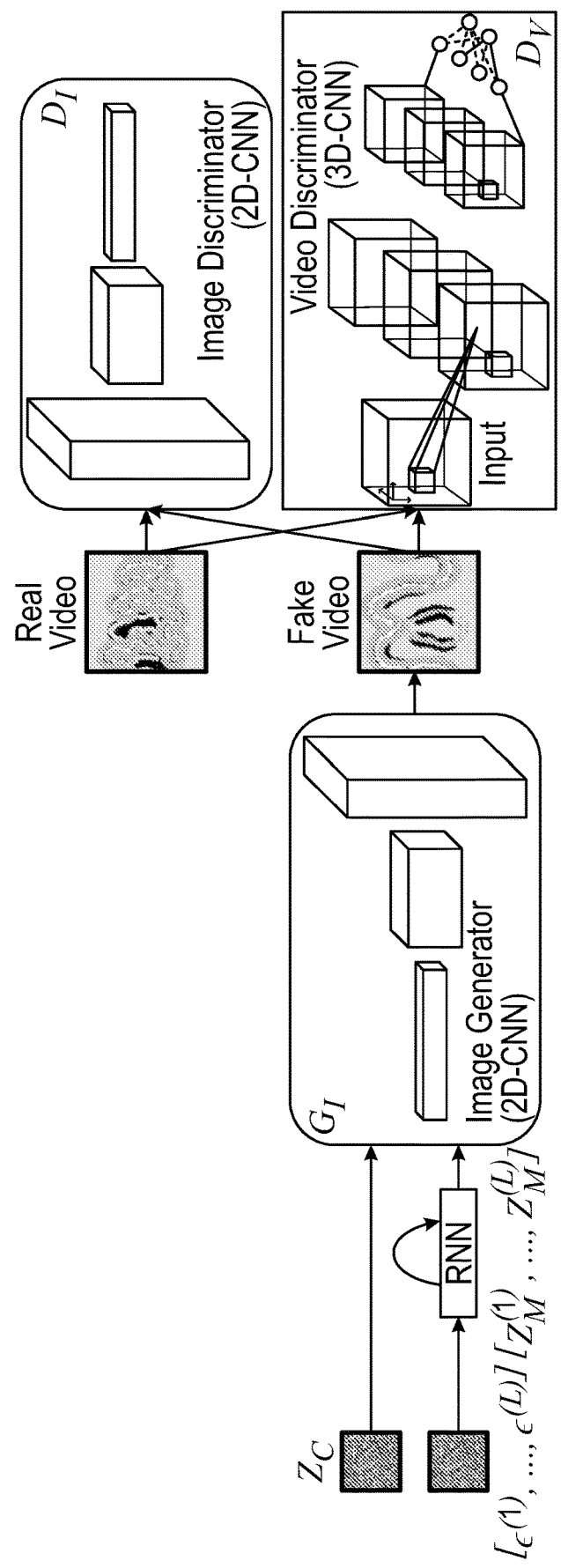
FIG. 1 depicts a schematic of a Motion and Content decomposed GAN.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Data is crucial for implementing, training and applying Artificial Intelligence and Machine Learning (AIML) solutions for subsurface interpretation. There are two types of data: real and synthetic. While real data is often desirable, it is generally sparse, unlabeled, and biased. To overcome these challenges of getting the appropriate data a synthetic data platform ("SDP") is disclosed, the SDP is a Geology "process mimicking" platform.

The SDP uses simulation-based data synthesis. Synthetic data is not real data but it approximates the real data regarding the physics attributes, and as such has many advantages over any AIML approach based explicitly or implicitly on real data. Synthetically generated data is automatically labeled. The full spectrum of physically plausible states can be modeled, thereby managing class bias that is ubiquitous in real data. Vast amounts of synthetic data can be generated using parallelized cloud computing at a cost which is much lower than acquiring real data. There are essentially no privacy or security concerns with this type of data. Synthetic data can be relatively simplistic, but this can generally be addressed by increasing the sophistication of the modeling engine as required. The synthetic data can also be created to include noise and bias matching real data as required for accurate training.

The SDP can be used to create a library of 3D geological models that can be used in a variety of novel AIML geological workflows. For example, the 3D geological models can be used with a AIML based querying application to rapidly search the library for analogs that can explain observations or insight into planned measurements. The SDP can also be used to train an AIML based solution to generate in an automated manner a plurality of physically valid three-dimensional geological models conditioned to observations ("Model Generator"). Any now know or future known SDP can be used. One skilled in the art with the aid of this disclosure would know what SDP can be used.

A stratigraphic forward modeler (SFM) that can be physics based can be used to generate 3D stratigraphic models. The SFM can be part of the SDP or a stand-alone SFM. The SFM can be physics based or any other SFM that is now known or future known. The SFM can be used to generate a library of 3D stratigraphic models with the help of high-performance computing (HPC). A 3D stratigraphic model can be regarded as a video stacking L frames of 2D images $X=[x^{(1)}, \ldots, x^{(L)}]$, and each image $x^{(i)}$, i=1, . . . , L, represents a snapshot of the deposited rock facies properties from a certain geologic time step [3]. These models can be built by a physics based SFM, layer by layer like 3D printing. Although the SFM can create accurate models based on physics laws, it may take hours for one single high-resolution 3D stratigraphic model, or multiple models with HPC. Nevertheless, observed well measurements are not taken into accounts during the model creation process.

To accelerate the model creation process and fully utilize observed well measurements, an AIML technique called generative adversarial networks (GAN) whose training set is created by the SFM using HPC can be used. The purpose of GAN is to learn the underlying distribution of the training data X and embed it to a latent vector z in an unsupervised manner. GAN consists of two neural networks, a generator G and a discriminator D. The objective of G is to generate data from z to look like training data sampled from a distribution $p_X$ while the objective of D is to distinguish between the training data $X \sim p_X$ and the generated data G(z). G and D are trained by solving the following optimization problem in Equation (1) until they reach a Nash equilibrium:

$$\min_G \max_D E_{X \sim p_X}[\log(D(X))] + E_z[\log(1 - D(G(z)))]. \quad (1)$$

GAN enables the generation of novel data samples like the training data very quickly after both of its generator and discriminator have been well trained. GAN was originally proposed to generate 2D images. The challenge of extending this approach to 3D was demonstrated in prior art, but directly creating large models directly using 3D GAN proved infeasible. However, it is recognized that a 3D volume of geological sediment is a sequential composition of 2D deposition and erosion, we could treat the problem of building the 3D model as analogous to 3D printing or additive manufacturing. To support this concept, a stratigraphic forward modeler that constructs the 3D model in this manner to generate training data. Recognizing that these training data are analogous to videos of the geology evolving in geological time; therefore, a more lightweight but advanced GAN solution called Motion and Content decomposed GAN (MoCoGAN). FIG. 1 illustrates the overall framework of MoCoGAN.

The MoCoGAN generator $G_I$ converts a sequence of latent vectors $z=[z^{(1)}, \ldots, z^{(L)}]$ to a video $\tilde{X}=[\tilde{x}^{(1)}, \ldots, \tilde{x}^{(L)}]$ using 2D convolutional neural network (CNN):

$$\tilde{X} = [\tilde{x}^{(1)}, \ldots, \tilde{x}^{(L)}] = G_I([z^{(1)}, \ldots, z^{(L)}]) = G_I\left(\left[\begin{bmatrix} z_C \\ z_M^{(1)} \end{bmatrix}, \ldots, \begin{bmatrix} z_C \\ z_M^{(L)} \end{bmatrix}\right]\right) \quad (2)$$

where the value of L determines the length of video. As shown in Equation (2), MoCoGAN decomposes each latent vector $z^{(i)}$ into two components: a fixed content component $z_C$ that models object appearance in the video and a motion component $z_M^{(i)}$ that models the moving trajectory of the object. To generate geological videos, the content latent vector $z_C$ models motion-independent part of stratigraphic models such as the fluvial channel, while the motion latent vector $z_M^{(i)}$ models changes of fluvial channels over time, like the changes of channel curvatures, the creation and deposition of oxbow lakes and crevasse splays, etc. We can sample $z_C$ from a Gaussian distribution as $z_C \sim \mathcal{N}(0, I_C)$ where $I_C$ is the content latent vector length. The motion trajectory path $[z_M^{(1)}, \ldots, z_M^{(L)}]$ are the sequential outputs from a recurrent neural network cell such as Gated Recurrent Unit (GRU) or Long Short-Term Memory (LSTM) by providing a series of independent and identically distributed (i.i.d.) Gaussian vector $\epsilon^{(i)} \sim \mathcal{N}(0, I_M)$, i=1, . . . , L, at each timestep, where $I_M$ is the motion latent vector length.

The MoCoGAN has two discriminators, a video discriminator $D_V$ and an image discriminator $D_I$. $D_V$ equips 3D CNN and is trained to determine if a video it sees is from a real video from training set $X \sim p_X$ or is generated by the generator $\tilde{X}=G_I([z^{(1)}, \ldots, z^{(L)}])$. On the other hand, $D_I$ equips 2D CNN and is trained to criticize if any image frame is sampled from X, or from $\tilde{X}$.

The training of MoCoGAN still follows the alternating gradient update algorithm proposed with GAN. First $D_V$ and $D_I$ are trained while the neural network in $G_I$ is frozen for a few batches, and then $G_I$ is trained for one batch while the neural networks in $D_V$ and $D_I$ are frozen. Each video sample sent to train $D_V$ contains T consecutive frames from either the video training set or a generated video and each image sample sent to train $D_I$ is a one single frame randomly selected from a training or generated video. Having the notation of T-frame video sampler as $S_T$ (T≥1), we can denote the MoCoGAN training loss as follows:

$$\min_{G_I}\max_{D_I} L(D_I, G_I) + \min_{G_I}\max_{D_V} L(D_V, G_I) \quad (3)$$

where $$L(D_I, G_I) = E_{X \sim p_X}[\log(D_I(S_1(X)))] + E_z[\log(1 - D_I(S_1(G_I(z))))] \quad (4)$$

$$L(D_V, G_I) = E_{X \sim p_X}[\log(D_V(S_T(X)))] + E_z[\log(1 - D_V(S_T(G_I(z))))]. \quad (5)$$

The optimal values of the original MoCoGAN training loss defined in Equations (3)-(5) are quite challenging to obtain because they are actually the Jensen-Shannon (JS) divergence between the training data distribution $p_X$ and the generated data distribution $p_{\tilde{X}}$. The JS divergence is not continuous everywhere, and hence its gradients are prone to huge oscillation. Instead, the Wasserstein-1 distance between $p_X$ and $p_{\tilde{X}}$ are better formed to have continuous gradients everywhere and hence it is easy to train with. Hence, we redefine the MoCoGAN training losses using the Wasserstein loss:

$$L(D_I, G_I) = E_{X \sim p_X}[D_I(S_1(X))] - E_z[D_I(S_1(G_I(z)))] \quad (6)$$

$$L(D_V, G_I) = E_{X \sim p_X}[D_V(S_T(X))] - E_z[D_V(S_T(G_I(z)))] \quad (7)$$

where the output values of $D_I$ and $D_V$ are unbounded real-valued numbers, rather than further activated by the sigmoid function to restrict them between [0, 1].

Since a trained MoCoGAN generator converts each latent variable $z^{(i)}=[z_C^T \; z_M^{(i)T}]^T$ to an image frame $\tilde{x}^{(i)}$ of a video, we can fine-tune the content of each $z^{(i)}$ to get a correspondingly desired frame that matches some criterion. Such method can be regarded as constrained image generation. The disclosed workflow searches for a series of latent vectors $z=[z^{(1)}, \ldots, z^{(L)}]$ that can generate a 3D stratigraphic model where depth-wise logs sampled at certain well positions match some reference measurements as best as possible.

These latent vectors can be optimized from random initializations via the gradient backpropagation method. The gradient is defined on the log matching loss with respect to the input latent vectors while the weights in $G_I$, $D_V$, and $D_I$ are all frozen in the computational graph. For the constrained image generation problem under the context of GAN, we define the log matching loss $L_m = L_c(z|y,M) + w \cdot L_p$ (z) as a weighted sum of the context loss $L_c(z|y,M)$ and prior loss $L_p(z)$ with a weighting factor w. Their definitions are:

$$L_c(z \mid y, M) = \|M \odot (G_I(z) - y)\|_1 \quad (8)$$

$$L_p(z) = -D_I(S_1(G_I(z))) - D_V(S_T(G_I(z))). \quad (9)$$

$L_c$ (z|y,M) is the difference between the known measurements y and the logs at the generated model $G_I(z)$ masked by a binary mask M in which 1 means the location with a well and 0 means otherwise. $L_p(z)$ is the second term in the video discriminator training loss of Equation (7) that penalizes the unrealistic models. Without such term, forcing the log in the generated model to approach the known measurements may result in the physically unplausible models. Then we can use stochastic gradient method to find the optimal $\hat{z}=[\hat{z}^{(1)}, \ldots, \hat{z}^{(L)}]$ by applying $\partial L_m/\partial_z$ to z iteratively.

It can become more challenging to train and obtain high-quality 3D stratigraphic models if their resolutions become high due to the curse of dimensionality. To address this problem, the workflow uses dimensionality reduction, by allowing MoCoGAN to train on the low-resolution samples $X_E$ encoded from the high-resolution 3D stratigraphic models X of the training set.

Variational AutoEncoder (VAE) is a well-suited dimensionality reduction methodology to embed a high-dimensional distribution into a low-dimensional posteriori distribution using an encoder-decoder architecture. After training, the VAE encoder yields the mean and the log standard deviation that parameterize the low-dimensional posteriori distribution while the VAE decoder samples from it and reconstruct the input distribution to its best extent.

Aspects herein adopt a fully convolutional VAE to compress image frames in case they are too large to directly train MoCoGAN. The first step of this workflow is to train such VAE's encoder and decoder with all image frames in the high-resolution video training set with distribution $p_X$ and embed all of them to a low-resolution 2D latent space with posteriori distribution $p_{X_E|X}$. In this approach as a preprocessing step, the entire video training set is encoded into a new compressed one. Each compressed video sample $X_E \sim p_{X_E|X}$ has the same number of frames as the native sample $X \sim p_X$ but each frame has a lower spatial resolution and a new number of channels. The MoCoGAN is trained as before, but now on the compressed data $X_E \sim p_{X_E|X}$. The trained MoCoGAN generator now generates video $G_I(z)$ of the same size as any $X_E$ in the encoded domain. The encoded video is then decoded by the VAE decoder, as a postprocessing step, back to the original domain to be a high-resolution 3D stratigraphic model. This combination of VAE with MoCoGAN bridges the gap between noisy input latent vectors and high-resolution 3D stratigraphic models.

EXAMPLES

In one example embodiment, the video training set contains a few hundreds of 3D stratigraphic models created by our physics based fluvial channel SFM with different petrophysical and rock facies configurations and random seeds. These models are created as 256×256 maps in spatial x and y dimensions with 200 years of geological depositions. Since our SFM determines a deposition sampling rate of 2 years and 4 different kinds of rock facies, each model can be regarded as a video containing L=101 frames of 4-channel images with each channel of size 256×256. If we denote the number of channels per image frame as C and the image size as N×N, each video sample X is a 4D tensor of shape (L, C, N, N).

As the first step to reduce the dimensionality, VAE is trained to reduce the size of each image frame from (C, N, N) to (C', N', N') for all videos, where C'=8 and N'=64. Therefore, the size of the compressed video training set $X_E \sim p_{X_E|X}$ is just ⅛ of the original training set $X \sim p_X$. MoCoGAN is then trained on $X_E \sim p_{X_E|X}$ with 30000 batches with each batch containing 128 image frames and 32 videos. Training of VAE takes about half a day on a Nvidia RTX2080 GPU and training of MoCoGAN takes about 4 days on the same accelerator.

Figure 2:
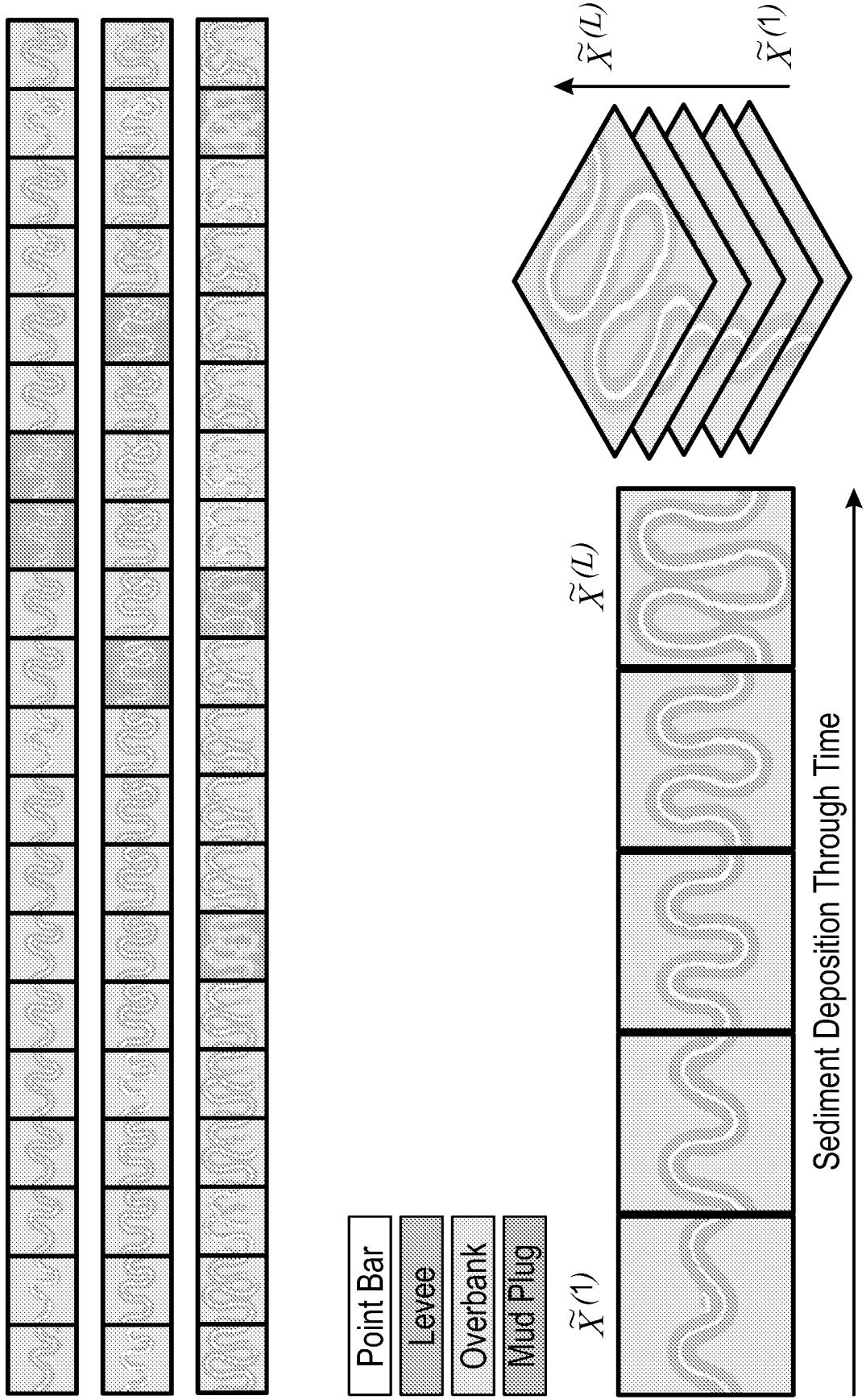
FIG. 2 depicts an unconditional high-resolution three dimensional stratigraphic model example, according to an embodiment of the disclosure.

After completing the train of both VAE and MoCoGAN, aspects of this disclosure are able to create unconditional high-resolution 3D stratigraphic models of shape (L', C, N, N) where L'≤L. FIG. 2 shows a few generated models of L'=20 frames and they are created in less than one second. All rock facies may be seen/identified such as levee, overbank, point bar, and mud plug are correctly created at the right locations and the temporal correlation across consecutive 40 years of depositions are accurately maintained. Particularly, we can see mud plugs are created and deposited when a wide meander of the fluvial channel is cut off. All such spatial and temporal features existed in the video training set are learned by MoCoGAN. With the help of the Wasserstein training loss, we also make sure the generated models have sufficient diversity in appearances.

Figure 3:
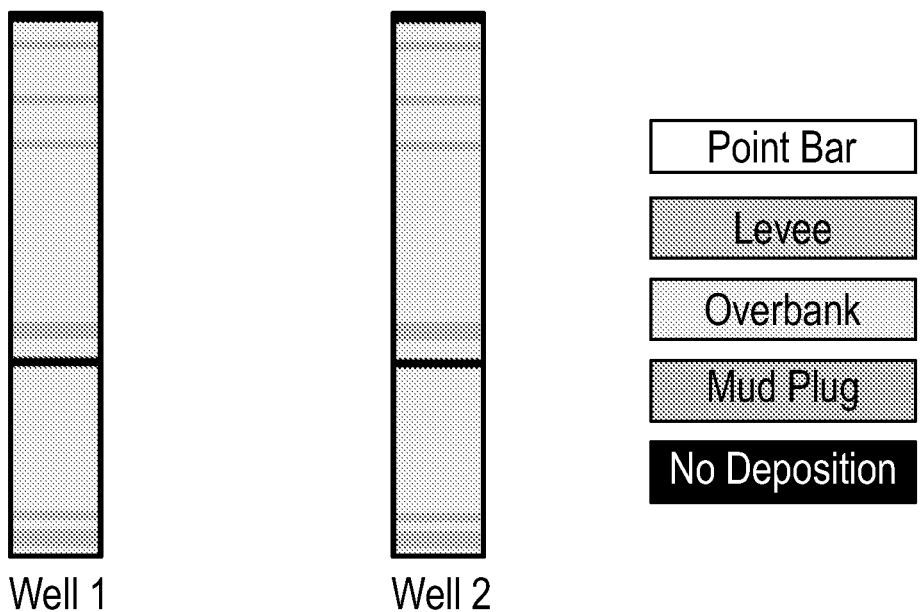
FIG. 3 depicts reference depofacies logs for conditioning.

The workflow can also use finetuning latent vectors z to create constrained 3D stratigraphic models whose logs at particular well locations approach the arbitrarily given reference well measurements. In this test example, two well measurements regarding rock facies sampled at two well locations are provided, as shown in FIG. 3.

Figure 4:
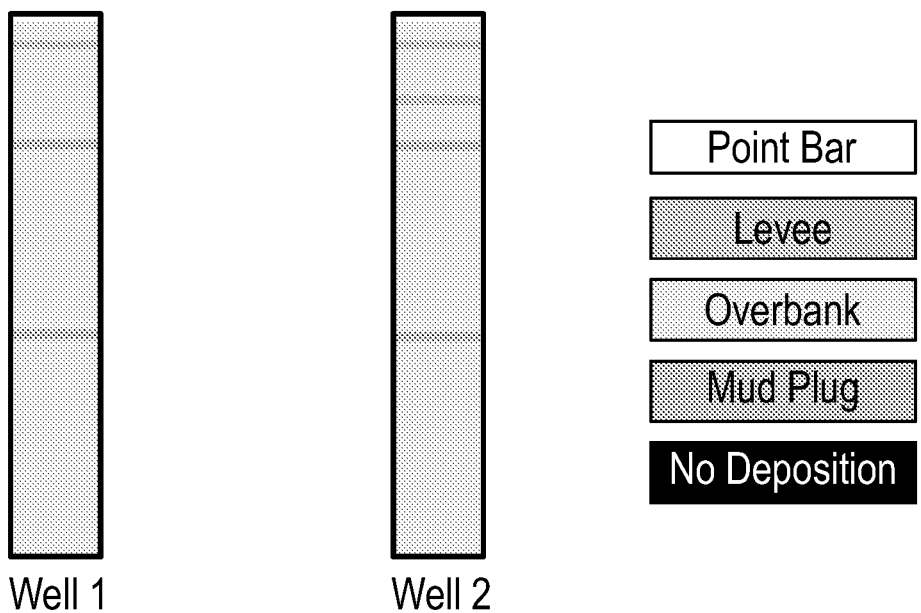
FIG. 4 depicts depofacies logs sampled from a generated constrained model.
Figure 5:
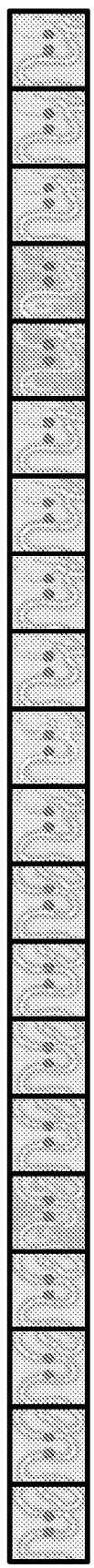
FIG. 5 depicts a conditioned high-resolution 3D stratigraphic model example whose sampled logs correspond to FIG. 4.

The disclosed workflow in one or more embodiments, iteratively optimizes z by recreating models, sampling logs to calculate log matching loss $L_m$ and applying $\partial L_m / \partial_z$ until $L_m$ reaches its minimum. After 10000 iterations of optimizations, FIG. 4 shows the facies log sampled from a constrained generated model. We can see that the overbank, levee, and mug plug are mostly recovered. FIG. 5 shows the corresponding conditioned 3D stratigraphic model from which the facies logs in FIG. 4 are sampled from red dots (left for Well 1 and right for Well 2).

The disclosed framework can be used to rapidly create high-resolution 3D stratigraphic models. It takes advantage of GAN architectures for video as exemplified by MoCoGAN along with many customized improvements, such as the Wasserstein training loss for improved model diversity and a prior VAE for efficient model compression. After training, aspects of the disclosure create unconditional models that look similar to those in the training set within seconds without the need of waiting for a couple of hours on the physics-based forward modeler. More importantly, since all the generated models are converted from a series of latent vectors, the disclosed workflows and platform can fine-tune these vectors to create constrained and realistic models whose logs sampled at specific well locations match the reference measurements. The disclosed platforms and workflows enable high-resolution 3D stratigraphic modeling driven by artificial intelligence. Its swiftness and compatibility enable a seamless integration to any reservoir modeling workflow.

In one example embodiment, a method of training a motion and content decomposed generative adversarial network is disclosed. The method may comprise training a video discriminator and an image discriminator with a neural network in an image generator using at least two batches of data, wherein the data batch sent to train the image discriminator comprises randomly selected data from one of actual data and generated data. The method may further comprise freezing neural networks for the video discriminator and the image discriminator. The method may also further comprise training, using at least one batch of data, the image generator with the neural networks for the video discriminator and the image discriminator.

In another example embodiment, the method may be performed wherein the data is actual data from a field location.

In another example embodiment, the method may be performed wherein the data is generated data from a computer.

In another example embodiment, the method may be performed wherein each data batch sent to train video discriminator contains T consecutive frames from data.

In another example embodiment, the method may be performed wherein the generative adversarial network is two neural networks, In another example embodiment, the method may be performed wherein at least one of the two neural networks is a generator network.

In another example embodiment, the method may be performed wherein at least one of the two neural networks is a discriminator network.

In another example embodiment, the method may be performed wherein the data contains high-resolution three-dimensional stratigraphic modeling data.

In another example embodiment, the method may be performed wherein artificial intelligence is used in the training.

In another example embodiment, the method may be performed wherein the freezing of the neural networks for the video discriminator and the image discriminator includes fixing a number of weights in computations.

In another example embodiment, a computer program product is disclosed. The product may comprise a computer usable medium having a computer readable program code embodied therein, said computer readable program code adapted to be executed to implement a method for generating a report, said method comprising: training a video discriminator and an image discriminator with a neural network in an image generator using at least two batches of data, wherein the data batch sent to train the image discriminator comprises randomly selected data from actual data or generated data. The method may further comprise freezing neural networks for the video discriminator and the image discriminator and training, using at least one batch of data, the image generator with the neural networks for the video discriminator and the image discriminator.

In another example embodiment, the computer program product may be configured such that the computer is one of a server, a personal computer, a cellular telephone, and a cloud based computing arrangement.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A method of training a motion and content decomposed generative adversarial network comprising:
    training a video discriminator and an image discriminator that each include a neural network in an image generator using at least two batches of three-dimensional (3D) stratigraphic modeling data, wherein a first batch of data included in the at least two batches of 3D stratigraphic modeling data is sent to train the image discriminator and comprises randomly selected data from one of actual 3D stratigraphic modelling data and synthetically generated 3D stratigraphic modelling data of different petrophysical and rock facies configurations;
    freezing neural networks for the video discriminator and the image discriminator; and
    training, using low-resolution samples encoded from the 3D stratigraphic modeling data, the image generator with the neural networks for the video discriminator and the image discriminator;
    fine-tuning a sequence of latent vectors to generate a plurality of constrained 3D stratigraphic models, wherein depofacies logs of the plurality of constrained 3D stratigraphic models that are sampled at selected well locations match a set of defined reference measurements; and
    wherein generating the plurality of constrained 3D stratigraphic models includes converting, with the image generator, the sequence of latent vectors to a video by decomposing each latent vector included in the sequence of latent vectors into a fixed component modeling motion-independent part of a fluvial channel and a motion component modeling changes of the fluvial channel over time.

2. The method according to claim 1, wherein the 3D stratigraphic modeling data is actual data from a field location.

3. The method according to claim 1, wherein the 3D stratigraphic modeling data is synthetically generated data from a computer.

4. The method according to claim 1, wherein each data batch included in the at least two batches of 3D stratigraphic modeling data and sent to train video discriminator contains T consecutive frames from data.

5. The method according to claim 1, wherein the content decomposed generative adversarial network is two neural networks.

6. The method according to claim 5, wherein at least one neural network of the two neural networks is a generator network.

7. The method according to claim 5, wherein at least one neural network of the two neural networks is a discriminator network.

8. The method according to claim 1, wherein artificial intelligence is used in the training.

9. The method according to claim 1, wherein the freezing of the neural networks for the video discriminator and the image discriminator includes fixing a number of weights in computations.

10. A computer program product, comprising a non-transitory computer usable medium having a computer readable program code embodied therein, said computer readable program code adapted to be executed to implement a method for generating a report, said method comprising:
    training a video discriminator and an image discriminator that each include a neural network in an image generator using at least two batches of three-dimensional (3D) stratigraphic modeling data, wherein a first batch of data batch-included in the at least two batches of 3D stratigraphic modeling data is sent to train the image discriminator and comprises randomly selected data from actual 3D stratigraphic modelling data or synthetically generated 3D stratigraphic modelling data of different petrophysical and rock facies configurations;
    freezing neural networks for the video discriminator and the image discriminator; and
    training, using low-resolution samples encoded from the 3D stratigraphic modeling data, the image generator with the neural networks for the video discriminator and the image discriminator;
    fine-tuning a sequence of latent vectors to generate a plurality of constrained 3D stratigraphic models, wherein depofacies logs of the plurality of constrained 3D stratigraphic models that are sampled at selected well locations match a set of defined reference measurements; and
    wherein generating the plurality of constrained 3D stratigraphic models includes converting, with the image generator, the sequence of latent vectors to a video by decomposing each latent vector included in the sequence of latent vectors into a fixed component modeling motion-independent part of a fluvial channel and a motion component modeling changes of the fluvial channel over time.

11. The computer program product according to claim 10, wherein the computer is one of a server, a personal computer, a cellular telephone, and a cloud based computing arrangement.

12. The method according to claim 3, wherein the synthetically generated 3D stratigraphic modeling data is generated from a synthetic data platform.

13. The computer program product according to claim 10, wherein the synthetically generated 3D stratigraphic modeling data is generated from a synthetic data platform.

* * * * *